Sept. 4, 1956  A. GERBER ET AL  2,761,880
IMPROVED PROCESS FOR MAKING ALCOHOLIC
SOLUTIONS OF ALKALI-METAL ALKOXIDES
Filed Dec. 31, 1953
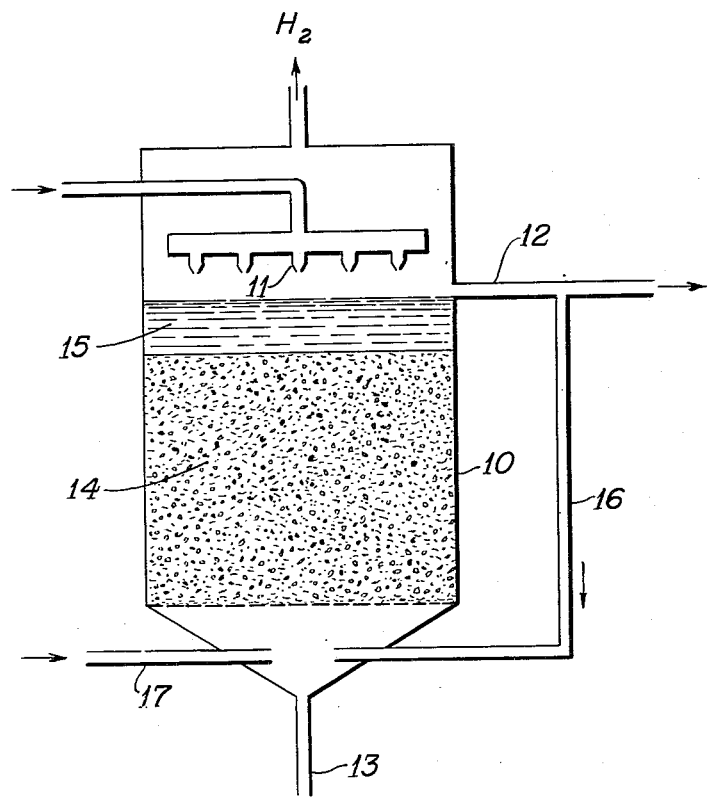
INVENTORS
Adolf Gerber
Otto Leschhorn
Helmut Müller
Josef Rambausek
BY K. A. Mayr
ATTORNEY

United States Patent Office 2,761,880
Patented Sept. 4, 1956

2,761,880

IMPROVED PROCESS FOR MAKING ALCOHOLIC SOLUTIONS OF ALKALI-METAL ALKOXIDES

Adolf Gerber, Otto Leschhorn, Helmut Müller, and Josef Rambausek, Burghausen-Upper Bavaria, Germany, assignors to Wacker-Chemie G. m. b. H., Munich, Germany, a firm of Germany Application December 31, 1953, Serial No. 401,592

Claims priority, application Germany May 5, 1953

4 Claims. (Cl. 260—632)

The present invention relates to an improved method for the preparation of alcoholic solutions of alkali-metal alkoxides, which find many uses in organic chemistry.

One of the known processes for the preparation of alcoholic solutions of alkali-metal alkoxides consists in reacting an alkali-metal amalgam, which may be obtained by electrolysis of an alkali-metal chloride using a mercury cathode, with an alcohol in liquid phase, whereby the alkali-metal component of the amalgam reacts, as far as conditions permit, with the alcohol and is thus separated from the mercury, which, if desired, may be recycled to the cathode pool of a suitable electrolytic cell for use in making more amalgam. Because one of the characteristic properties of alkali-metal amalgams is the difficulty with which they may be separated into their components, substantially complete reaction in this process is not readily attainable. Another known process for making alcoholic solutions of alkali-metal alcoholates comprises exposing alkali-metal amalgam to alcoholic vapors. This vapor-phase process is disadvantageous in that it requires expensive and cumbersome apparatus and it is less economical to operate than a liquid-phase process because of the fuel requirements involved.

Now we have found that it is possible, by means of an improved liquid-phase process utilizing simple and inexpensive apparatus, to cause reaction of an alcohol with an alkali-metal amalgam to proceed substantially to completion, and, by maintaining certain reaction conditions, to obtain alkali-free mercury.

Our method for preparing alcoholic solutions of alkali metal alkoxides comprises reacting an alcohol with a finely dispersed alkali-metal amalgam, such as may be obtained from the electrolysis of an alkali chloride in a suitable electrolytic cell utilizing a mercury pool as cathode to which alkali-metal-free mercury is returned, by gravity flow of a stream of finely divided alkali-metal amalgam against an upward countercurrent of alcohol within a reaction vessel containing pieces of a catalyst, 2 to 3 mm. in size. In this manner it is possible to maintain the alkali metal amalgam as minute discrete particles or globules, which remain dispersed individually during their entire passage through the reaction vessel. However, if the conditions of the herein claimed method are not strictly maintained, the amalgam becomes stratified as it passes downwardly, and, as a result of insufficiently fine distribution, passes through the reaction vessel too rapidly to react efficiently with the countercurrent stream of alcohol. On the other hand, if the amalgam is too finely distributed, the resulting mercury particles become so minute that downward gravity flow through the catalytic bed is impaired and obstructed, which causes local overheating and interferes with the decomposition of additional amalgam. Only by employing a catalyst having a particle size of 2 to 3 mm. is it possible to maintain that proper distribution of the downflow of amalgam which assures a complete reaction between the amalgam and the alcohol within the relatively confined space of the reaction vessel.

The accompanying schematic drawing illustrates the manner of utilizing this invention.

Alkali-metal amalgam is introduced into the upper part of a vertically disposed, essentially cylindrical, hollow reaction vessel 10 through a pipe line communicating with a plurality of spraying nozzles, one of which is indicated by the reference numeral 11, each having an outlet opening about 1 to 2 millimeters in diameter. The nozzles are mounted in such a spaced relationship that one nozzle is provided for each vessel cross-sectional area of 165 square centimeters. The alcoholic alkoxide solution obtained as the reaction product is discharged from the reaction vessel through a discharge opening or pipe line 12, while alkali-metal-free mercury is removed by means of an outlet 13, located at the bottom of the reaction vessel 10. If desired, the discharged mercury may be returned or passed to the cathode pool of a suitable electrolytic cell (not shown) for making further quantities of amalgam.

It will be noticed that the nozzles provided for introducing the amalgam into the reaction vessel are disposed somewhat above the level of the opening or pipe line 12, provided for discharge of the alcoholic alkoxide solution. The reaction vessel, it will be noticed, is provided with a supporting grid near the bottom and the major portion of the vessel above this grid to a height near but below the discharge opening 12 is charged with a divided catalyst mass 14. A supernatant liquid layer 15 overlies the catalyst mass, substantially as shown, and extends upward to the level of the discharge opening 12. The finely divided amalgam emitted from the nozzles passes through the liquid layer before it reaches the zone containing the catalyst mass, which has been found to facilitate maintaining the desired fine division and distribution of the amalgam particles to a degree that cannot be attained by spraying the amalgam directly on the catalyst mass. It has been found to be advantageous to by-pass part of the discharged alcoholic alkoxide solution and to recycle it, through the pipe line 16, to the bottom part of the reaction vessel, where it mixes with fresh alcohol and is passed in countercurrent to the amalgam, upwardly through the vessel. This not only results in an improvement of the reaction conditions, but also produces an increase in the alkoxide concentration of the product solution.

We found it expedient to use as a catalyst a mixture of electrode graphite or activated carbon with metal shavings, particularly, iron shavings. A mixture of activated carbon with about 10 to 20 percent of iron shavings is especially satisfactory as a catalyst mass. The activity and period of usefulness of the catalyst can be substantially increased by reactivating it from time to time by treatment with hypochlorites and hydrochloric acid.

Example

An apparatus, substantially as above-described, is utilized, comprising a vertically disposed tower, approximately 80 centimeters in diameter and 180 centimeters in height, provided with 28 spraying nozzles in the top part thereof for introducing amalgam into the interior of the tower, and provided, too, with suitable alcohol inlet, product solution outlet and mercury discharge lines, arranged essentially as shown in the drawing. The interior of the tower is charged with a catalyst mass consisting of a mixture of about 80% to 90% graphite, preferably of the type used as anodes in electrolysis, with about 10% to 20% of iron shavings, the catalyst mass being composed of particles about 2 to 3 millimeters average diameter.

During a period of about one hour, approximately 4000 kilograms of sodium amalgam, obtained by electrolysis of sodium chloride using a mercury cathode, is introduced into the tower through the spray nozzles and, during the same period of time, about 280 liters of ethyl alcohol are passed through the tower, in countercurrent to the downflow of finely divided amalgam. It will be understood that the reaction zone in the interior of the tower may be visualized as consisting of 28 adjacent columns, each about 180 centimeters high, each having a cross-sectional area of 165 square centimeters and each being filled with catalyst. Ten liters of alcohol per hour pass through each of the columns from below, while, at the same time, a downstream of about 143 kilograms of sodium amalgam enters the column from a nozzle above. The reaction results in an about 15 percent solution of sodium ethoxide in ethanol, which leaves the tower by means of a discharge outlet near the upper end. Using a larger or smaller quantity of ethyl alcohol produces a lower or higher concentration, respectively, of the sodium ethoxide in the solution. The mercury discharged at the bottom outlet is entirely free from sodium and can be directly recycled to the electrolytic cell. In lieu of ethyl alcohol, other liquid alcohols can be used when practising this process, resulting in alcoholic solutions of the corresponding alkoxides.

Having described our invention, we claim:

1. Process for making alcoholic solutions of alkali-metal alkoxides that comprises spraying alkali-metal amalgam into the interior of a reaction vessel near the top thereof; permitting it to flow downward by gravity as discrete, finely divided particles, through a catalytic mass comprised of a substance chosen from the group consisting of electrode graphite and activated carbon, with iron shavings, said catalytic mass being sub-divided into particles having an average diameter of about 2 to 3 millimeters; simultaneously flowing a countercurrent of an alcohol in liquid phase upward through the catalytic mass, whereby the finely divided particles of alkali-metal amalgam and the alcohol interact in the presence of the catalytic mass to form an alcoholic solution of alkali-metal alkoxide; withdrawing this solution from a supernatant liquid layer above the catalytic mass; and recovering spent alkali-metal-free mercury from the bottom portion of the reaction vessel.

2. Process as defined in claim 1, wherein the catalyst mass is comprised of mixed activated carbon and iron shavings in the proportion of 80% to 90% of the former and the remainder of the latter.

3. Process as defined in claim 2, wherein the alkali-metal amalgam is sodium amalgam, the alcohol is ethanol, and the product alkali-metal alkoxide is sodium ethoxide.

4. Process for making solutions of sodium ethoxide in ethanol that comprises spraying sodium amalgam into the interior of a reaction vessel near the top thereof; permitting it to flow downward through the vessel by gravity, as discrete, finely divided particles, over and through a catalytic mass comprised of activated carbon mixed with iron shavings in the proportion of 80% to 90% of the former and the remainder of the latter, said catalytic mass being subdivided into particles having an average diameter of about 2 to 3 millimeters; simultaneously flowing a countercurrent of liquid ethanol upwardly through the catalytic mass, whereby the finely divided sodium amalgam and ethanol interact in the presence of the catalytic mass to form an ethanol solution of sodium ethoxide; withdrawing this solution from a supernatant layer above the catalytic mass; recycling a portion of the withdrawn ethanol solution of sodium ethoxide upwardly through the catalytic mass; and recovering spent sodium-free mercury from the bottom portion of the reaction vessel.

References Cited in the file of this patent

UNITED STATES PATENTS

| | | |
|---|---|---|
| 2,000,329 | Heisel et al. | May 7, 1935 |
| 2,411,726 | Holroyd et al. | Nov. 26, 1946 |
| 2,520,146 | Houdry | Aug. 29, 1950 |
| 2,593,314 | Kimberlin | Apr. 15, 1952 |